April 27, 1965

H. S. CRIM 3,180,426

FREE TURBINE ENGINE CONTROL SYSTEM

Filed March 30, 1962

INVENTOR
HUGH S. CRIM
BY David S. Fishman
ATTORNEY

INVENTOR
HUGH S. CRIM
BY David S. Fishman
ATTORNEY 3,180,426
FREE TURBINE ENGINE CONTROL SYSTEM
Hugh S. Crim, Glastonbury, Conn., assignor to United
Aircraft Corporation, East Hartford, Conn., a corporation of Delaware
Filed Mar. 30, 1962, Ser. No. 183,848
7 Claims. (Cl. 170—135.74)

This invention relates to an engine fuel control. More particularly, it relates to a fuel control for an engine having a free turbine driven by a gas generator.

The following discussion will describe this invention as applied to a helicopter gas turbine engine, but it is to be expressly understood that this invention can be used for other free turbine engine installations in which a free turbine drives a variable pitch blade, such as a turboprop engine.

The present invention is contemplated for use with a helicopter gas turbine engine in which a compressor and turbine unit act as a gas generator to supply motive fluid to a free turbine which drives variable pitch rotor blades. Proper operation requires that the rotor speed remain constant at a selected value of rotor speed regardless of changes in load, i.e. changes in collective pitch of the blades. To this end, a free turbine control unit having a governor and fuel flow scheduling system is utilized to select and maintain the operating speed of the free turbine and rotor by regulating fuel flow. In addition, changes in load due to changes in collective pitch are fed into the free turbine control unit to reset or modify the fuel flow schedule and compensate for speed changes which would ordinarily be caused by the droop characteristics of the governor system. Thus, the collective pitch input to the free turbine control unit serves to effectively eliminate droop from the governing system and maintain a constant free turbine speed.

The gas generator also has a control unit having a governor and a fuel flow scheduling system which establishes the operating conditions and operating limits of the gas generator. The gas generator control unit is also reset or modified by changes in collective pitch to eliminate governor droop and to prevent overspeeding of the free turbine in the event of a failure of the free turbine governor.

The output signals from both the gas generator and free turbine control fuel units are fed into a common fuel metering mechanism which meters fuel to the gas generator. The units are designated so that the unit generating a signal of lower fuel flow (and hence lower gas generator speed) predominates to schedule fuel flow to the gas generator to the exclusion of the schedule established by the other unit. That is, the control operates to select the lower of the fuel flows scheduled by the two units. In this manner the gas generator control unit acts as a topping governor to prevent the free turbine unit from establishing a fuel flow which would cause the gas generator to exceed its operating limits, and the gas generator is prevented from delivering more power than is needed by the free turbine.

In order that the control can deliver the maximum power which might be called for by the free turbine control unit consistent with the operating limits of the gas generator, the gas generator control unit in the past has been set to generate a signal calling for the maximum permissible fuel flow and speed of the gas generator. The free turbine control unit would then generate an overriding signal calling for a lower fuel flow when the free turbine did not need all the power the gas generator could deliver. However, in the event the free turbine control unit malfunctioned the gas generator would then deliver full power to the turbine and cause an intolerable overspeed condition of the free turbine. The present invention eliminates this free turbine overspeed problem by feeding a collective pitch signal to the gas generator governor and fuel flow scheduling system. In this manner, the maximum potential output of the gas generator at any given time is made to vary with the power requirements of the free turbine; and a failure of the free turbine control unit will not result in an intolerable overspeed condition of the free turbine, but rather the gas generator output will be set to produce a free turbine speed slightly higher than would be realized with proper operation of the free turbine control unit.

This invention also incorporates structure which responds to an overspeed condition of the free turbine to shut off fuel flow to the gas generator, thus producing a windmill operating condition for the helicopter blades. However, termination of fuel flow will eliminate the overspeed condition and the fuel control would then function to resume fuel flow and the overspeed condition would again occur. To prevent this situation in which the fuel control would oscillate between delivering fuel and terminating fuel flow, a latch mechanism is provided which locks the overspeed responsive structure so that fuel flow cannot be resumed until the latch is manually released.

This invention is particularly suitable for use in multi-engine installations, such as a twin engine helicopter, wherein each engine has a separate fuel control. The use of the fuel control of this invention in such an installation results in greatly improved load-sharing characteristics between the engines. Each control is adjustable for gas turbine output, for free turbine speed, and for changes in collective pitch. Since both free turbines in a twin engine installation would be rotating at the same speed, and since the speed of the gas generators is a measure of the power being delivered by each gas generator, very accurate load sharing between the engines can be achieved by matching the speeds of the gas generators.

In addition, since both the free turbine and gas generator control units of each fuel control are adjusted for changes in collective pitch, either engine is capable of absorbing the full load of the rotor at any given value of collective pitch by scheduling the fuel flow limit setting of each gas generator control unit to be capable of providing 100% power for the rotor. Thus, if two engines are each absorbing 50% of the rotor load and the free turbine governor of one control malfunctions, an increase in fuel flow from that control will occur and cause an increase in power and speed of the associated gas generator. This will cause a momentary increase in speed of the rotor and hence of the free turbine of the other engine. The control of the other engine will react to this increase in speed to reduce the output power of its engine until the rotor overspeed condition is eliminated, even to the point of reducing the power output of that other engine to zero.

Accordingly, one feature of this invention is a novel fuel control providing improved control of a free turbine engine.

Another feature of the present invention is a novel fuel control for a gas generator and free turbine engine in which both the gas generator and the free turbine controls are modified in accordance with changes in load on the free turbine.

Still another feature of the present invention is a novel fuel control for a gas generator and free turbine engine in which the free turbine control unit regulates gas generator output within limits established by the gas generator control unit and in which changes in load on the free turbine modify or reset both the free turbine control and gas generator control units.

Still another feature of the present invention is a novel fuel control for a gas generator and free turbine engine in which fuel flow to the gas generator is terminated by an overspeed condition of the free turbine and is prevented from resuming until manually selected.

Still another feature of the present invention is a novel fuel control for a gas generator and free turbine engine in a multi-engine installation wherein all engines drive a common rotor in which a failure of the free turbine governor in one engine results in that engine assuming most of the rotor load.

Other features and advantages will be apparent from the specification and claims, and from the accompanying drawings which illustrate an embodiment of the invention.

FIGURE 3 is a partial showing of a twin-turbine helicopter having fuel controls in accordance with this invention.

Figure 1:
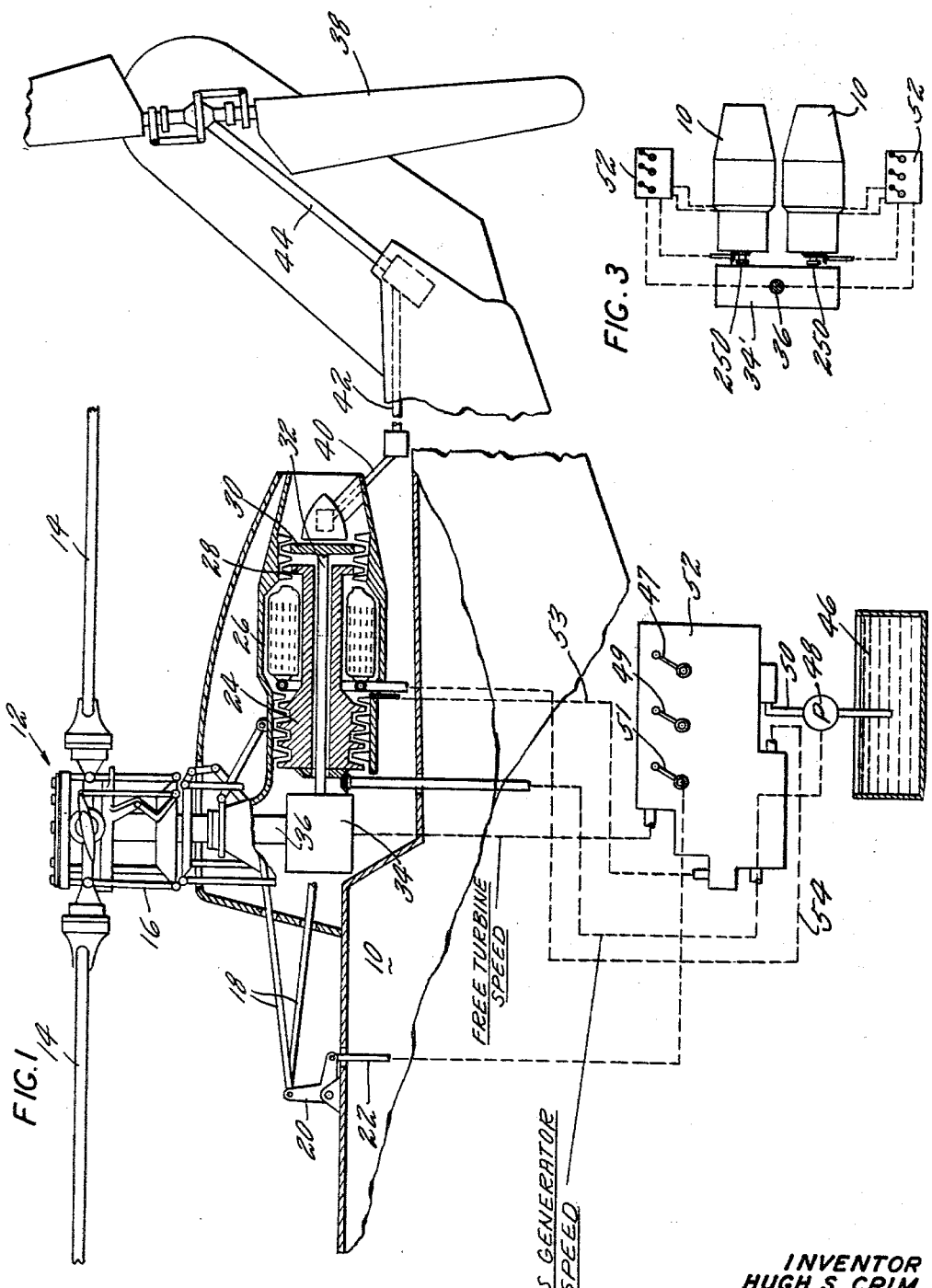
FIGURE 1 is a partial view of a gas turbine powered helicopter having a fuel control in accordance with this invention.

Referring to FIGURE 1, a fragmentary portion of the helicopter is indicated at 10, the helicopter having main rotor 12 with variable pitch blades 14 whose pitch is controlled through linkages 16 and 18. The variable pitch linkage is connected through bellcrank 20 and link valve 22 to the pilot's collective pitch lever, not shown. The particular operation of the collective pitch system is more clearly illustrated in Patent No. 2,811,324 which issued on October 29, 1957.

The gas turbine engine includes compressor 24, combustion section 26, turbine 28, and free turbine 30. Turbine 28 is connected to and drives compressor 24, and this turbine-compressor unit along with combustion section 28 constitute a gas generator for supplying motive fluid to free turbine 30. Free turbine 30 is connected to shaft 32 and through gear box 34 drives shaft 36 connected to main rotor 12. Free turbine 30 also drives tail rotor 38 through shafts 40, 42 and 44.

The speed of the gas generator unit will be referred to hereinafter as $N_G$, and the speed of the free turbine will be referred to hereinafter as $N_F$.

Fuel from tank 46 is pumped by engine-driven pump 48 via conduit 50 to fuel control 52 where it is metered and delivered via conduit 54 to the burners of combustion section 26. The metering of fuel in control 54 is accomplished through the setting of $N_G$ speed set lever 47 which establishes the speed setting and power output of the gas generator, the setting of $N_F$ lever 49 which establishes the speed of the free turbine, and the setting of lever 51 in accordance with changes in collective pitch to modify the settings of levers 47 and 49. The parameter of compressor discharge pressure is also delivered to control 52 via line 53 for fuel flow regulation, and the actual values of $N_G$ and $N_F$ are fed into control 52 to maintain the values selected by levers 47 and 49.

Figure 2:
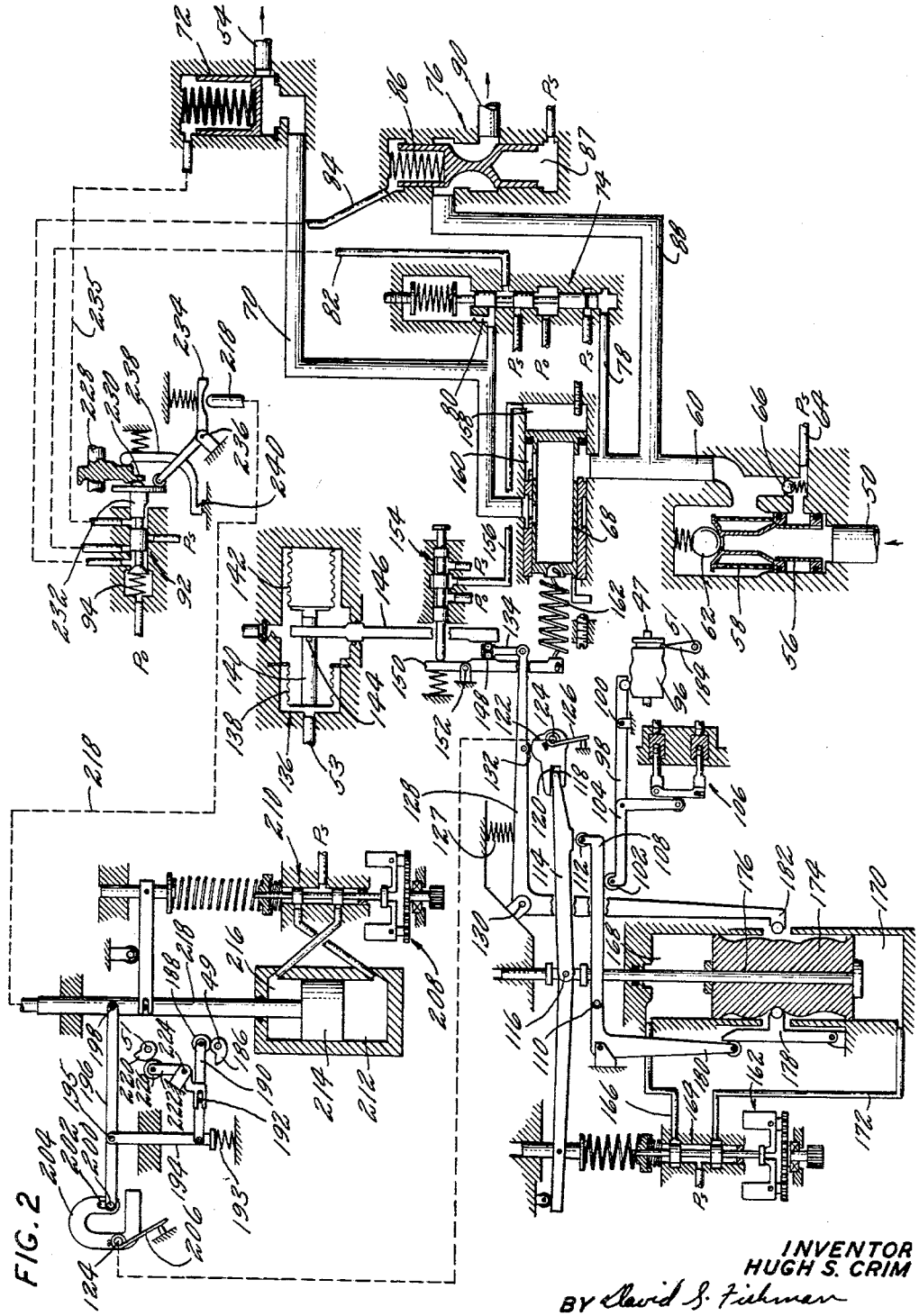
FIGURE 2 is a schematic representation of the fuel control of this invention.

Referring now to the control shown in FIGURE 2, fuel in conduit 50 flows through the center of fine mesh filter 56 and then through filter 58 to passage 60. A check valve 62 assures a supply of fuel to passage 60 in the event that filter 58 becomes clogged. A small portion of the fuel in conduit 52 passes through fine mesh filter 56 into passage 64 to act as servo fluid ($P_S$) for various elements in the fuel control. Check valve 66 in passage 60 assures a supply of servo fluid in the event that filter 56 becomes clogged.

The fuel in passage 60 passes through metering valve 68 where it is regulated and then delivered to passage 70. From passage 70 the fuel flows past pressurizing and shut-off valve 72 to conduit 54 and then to the burners in combustion section 26. The pressure drop across metering valve 68 is held constant by pilot valve 74 and bypass valve 76. The pressure upstream of metering valve 68 is delivered to the bottom of pilot valve 74 via conduit 78 and the pressure downstream of metering valve 68 is delivered to the top of pilot valve 74 via line 80. A decrease in the pressure drop across metering valve 68 results in a downward movement of pilot valve 74 to deliver servo pressure via conduits 82 and 84 to chamber 86 to close down bypass valve 76 to reduce the bypass flow via conduits 88 and 90 to pump inlet. Conversely, an increase in the pressure drop across metering valve 68 results in an upward movement of pilot valve 74 to deliver the pressure downstream of metering valve 68 to chamber 86 via conduits 82 and 84 to move bypass valve 76 in an opening direction to bypass an increased amount of fuel to pump inlet. Conduits 82 and 84 are connected to valve 92 which is normally held to the right by spring 94 so that conduits 82 and 84 are normally connected.

$N_G$ speed set cam 96 is rotated by movement of $N_G$ speed set lever 47 to move lever 98 about pivot 100 and position roller 102 at the end of bellcrank 104 which is connected to lever 98. One end of bellcrank 104 contacts trim adjustment mechanism 106 to allow for calibration of the output from $N_G$ cam 96. Roller 102 contacts lever 108 and moves it about pivot 110 to position roller 112. The position of roller 112 is a signal commensurate with a value of speed of the gas generator. Lever 114 is pivoted at 116 and has a roller 118 riding in a groove 120 on cam 122. Cam 122 is fixed to rotatable shaft 124 and is spring loaded in the counterclockwise direction by spring 126.

The mechanism just described from cam 96 to spring 126 forms part of the gas generator control unit which cooperates with the free turbine control unit, to be described hereinafter, to control the power plant. When conditions are such that the gas generator control unit is regulating fuel flow it overrides the free turbine control unit and vice versa. As shown in FIGURE 2, the gas generator control unit has been overridden by the free turbine control unit with the result that lever 114 has been lifted out of contact with roller 112.

However, assuming that the gas generator control unit was operating to regulate flow, lever 114 would be held in contact with roller 112 by the counterclockwise force on cam 122 from spring 126. A movement of $N_G$ lever 47 in an increasing speed direction would rotate cam 96 to cause a counterclockwise rotation of lever 98, a lowering of the positions of rollers 102 and 112, and a counterclockwise movement of cam 122 due to the loading of spring 126 to keep lever 114 in contact with roller 112. Spring 127 holds bellcrank 128 and cam follower 132 in contact with cam 122, and the counterclockwise rotation of cam 122 would result in a clockwise rotation of bellcrank 128 about pivot 130 to move multiplying bar 134 downward. Conversely, a movement of $N_G$ speed set lever 47 in the decrease speed direction would result in an upward movement of multiplying bar 134.

Compressor discharge pressure in line 53 is delivered to chamber 136 and loads bellows 138 in rod 140 to the right against evacuated bellows 142. Pin 144 on rod 140 contacts pivoted lever 146 and urges the end thereof into contact with slidable rollers 148 in multiplying bar 134. The rollers also contact lever 150 which pivots about point 152 and is in contact with the stem of the valve element in pilot valve 154. In this manner, compressor discharge pressure acts both as a fuel regulating parameter and an actuating force in the multiplying linkage. Movement of multiplying linkage 134 in a downward direction increases the moment arm of lever 150 and results in a rightward movement of the valve element in pilot valve 154 to port drain pressure ($P_0$) via line 156 to chamber 158 at the right of metering valve 68 whereby the high pressure in chamber 160 moves metering valve 68 to the right to increase fuel flow. The rightward movement of metering valve 68 is transmitted through feedback spring 162 to re-position lever 150 and return pilot valve 154 to the null position. Conversely, an upward movement of lever 134 reduces the moment arm of lever 150 and results in porting of servo pressure to chamber 158 to reduce fuel flow.

Governor 162 is driven by the gas generator and operates pilot valve 164. An increase in gas generator speed above the selected value ports servo pressure via line 166 to chamber 168 and vents chamber 170 via line 172 to move cam 174 downward. Cam 174 is integral with rod 176, and pivot point 116 is connected to rod 176. The downward movement of rod 176 causes lever 114 to pivot in a counterclockwise direction about roller 112 to rotate cam 122 in a clockwise direction to reduce fuel flow. Conversely, a decrease in gas generator speed below the selected value would result in chamber 170 being pressurized and chamber 168 being vented to move rod 176 upward and pivot lever 114 about roller 112 in a clockwise direction to rotate cam 122 in an increasing fuel flow direction.

Cam follower 178 contacts cam 174 and also contacts bellcrank 180, one end of which is connected to pivot point 110. This cam follower and its associated structure act to modify the output characteristics of cam 174 in a known manner. In addition, one end of bellcrank 128 has a cam follower 182 thereon which comes in contact with portions of cam 174 during engine acceleration to limit the clockwise rotation of bellcrank 128 and the downward movement of multiplying link 134 to keep engine fuel flow during acceleration within permissible limits.

Movement of the pilot's collective pitch lever 51 is fed into cam 96 by link 184 to translate cam 196 and modify or reset the position of roller 112. Hence, the position of roller 112 which is a signal of gas generator speed is modified as a function of collective pitch for a purpose to be more fully described hereinafter.

Reference will now be made to the structure and operation of the free turbine control unit. $N_F$ speed set cam 186 is connected to and actuated by $N_F$ speed set lever 49, cam 186 being rotated in a clockwise direction to increase free turbine speed and in a counterclockwise direction to decrease free turbine speed. Cam follower 188 at the end of link 190 is in contact with the surface of cam 186, and link 190 is pivoted at 192. Link 190 is connected to link 194 which in turn is connected at point 195 to link 196 which is pivoted at 198. Spring 193 urges link 194 upward. A roller 200 at the end of link 196 rides in slot 202 of link 204, and link 204 is spring loaded in the counterclockwise direction by spring 206.

As the structure is shown in FIGURE 2, the free turbine control unit is functioning to the exclusion of the gas generator control unit, and under this circumstance roller 200 is in contact with the bottom of slot 202. If the gas generator control unit were functioning to the exclusion of the free turbine control unit roller 200 would be riding in slot 202 out of contact with the bottom of the slot.

Link 204 is fixed to rotatable shaft 124 so that link 204 and cam 122 are both fixed to rotatable shaft 124. Movement of cam 186 in a clockwise direction to increase the speed of the free turbine results in a clockwise rotation of link 190 about pivot 192 and an upward movement of link 194. The upward movement of link 194 pivots link 196 about 198 and results in an upward movement of roller 200. The counterclockwise loading on link 204 from spring 206 causes a counterclockwise rotation of link 204 and shaft 124 to keep the bottom of slot 202 in contact with roller 200; and since cam 122 is fixed to shaft 124, cam 122 will be rotated in a counterclockwise direction to increase fuel flow to burner section 26. This increased fuel flow will make more power available at the discharge from the gas generator to drive free turbine 30, and assuming that the load on free turbine 30 remains constant, then free turbine speed will increase. Conversely, a counterclockwise rotation of cam 186 will result in a clockwise rotation of shaft 124 and cam 122 to decrease fuel flow to the gas generator and reduce free turbine speed.

Governor 208 is connected to and driven by the free turbine to maintain free turbine speed at the selected value. An increase in free turbine speed results in an upward movement of pilot valve 210 to port servo pressure to chamber 212 at the bottom of piston 214 and to vent chamber 216 at the top of piston 214. This results in an upward movement of rod 218 connected to piston 214 and to which pivot point 198 is also connected, and link 196 is rotated counterclockwise about point 195 to move shaft 124 and cam 122 in a fuel decrease direction. Conversely, a decrease in free turbine speed below the selected value results in a downward movement of piston 214 and rod 218 to rotate cam 122 in a fuel increase direction.

The position of roller 200 is commensurate with a scheduled speed of the free turbine. It is extremely important to maintain the speed of the free turbine and hence the speed of rotor 12 constant with changes in load due to changes in the pitch of blades 14. To this end, collective pitch lever 51 is connected to cam 220 and operates to reset the free turbine control unit. Lever 222 is pivoted at 224, and one end of lever 222 has cam follower 226 in contact with cam 220 while the other end of lever 222 is in contact with point 192 on link 190. A movement of collective pitch lever 51 in the direction of increased collective pitch results in a clockwise rotation of cam 220 with a resulting clockwise rotation of lever 222 about point 224. This results in an upward movement of link 194 and causes an increase in fuel flow to the gas generator as described above. Conversely, a decrease in collective pitch results in a counterclockwise rotation of cam 220 and a decrease in fuel flow. Thus, resetting of the position of roller 200 with changes in collective pitch has the effect of removing the droop characteristic from the control and maintaining a constant free turbine speed.

Thus, it can be seen that both the gas generator control unit and the free turbine control unit generate signals to a common fuel flow regulating cam, and the signals from both the gas generator control unit and the free turbine control unit are modified by collective pitch. The dimensioning and proportioning of the various control elements is such that the signal commensurate with the lower fuel flow is controlling and overrides the other signal. This is accomplished by the fact that when the gas generator control unit is calling for the lower fuel flow, roller 112 will be in contact with linkage 114 to rotate cam 122 in a clockwise direction. This clockwise rotation of cam 122 causes a clockwise rotation of shaft 124 to rotate link 204 in a clockwise direction and remove the bottom of slot 202 from contact with roller 200. Conversely, when the free turbine control unit is calling for the lower fuel flow, roller 200 will be in contact with the bottom of slot 202 to rotate link 204 and shaft 124 in a clockwise direction. The clockwise rotation of shaft 124 moves cam 122 in a clockwise direction, and through action of roller 118 and slot 120 linkage 114 will be rotated in a counterclockwise direction out of contact with roller 112.

To shut off all fuel flow to the engine, the pilot will move lever 47 to the OFF position and through suitable connection, shaft 228 will be rotated to a point where cam 230 contacts the end of valve element 232 and moves the valve element to the left. This leftward movement of valve element 232 will close off conduit 82 from conduit 84 and open conduit 84 to pump inlet pressure and at the same time deliver servo pressure via conduit 235 behind pressurizing and shutoff valve 72 in place of the drain pressure previously delivered behind valve 72. The reduced pressure in chamber 86 is overcome by the servo pressure in chamber 87, and bypass valve 76 is driven full open to bypass all of the pump output; at the same time the increased pressure behind valve 72 drives pressurizing and shutoff valve 72 to the closed position to cut off any fuel flow to the burners.

In the event that there is an intolerable increase in the speed of the free turbine, rod 218 contacts lever 234 and rotates it in a counterclockwise direction about pivot 236 to drive valve element 232 to the left. This actuates bypass valve 76 to bypass all of the pump output and shuts down pressurizing and shutoff valve 72 in the manner described above. Fuel flow to the engine will then be cut off and the overspeed condition will be eliminated. However, if fuel flow to the engine is allowed to resume it would only serve to reestablish the overspeed condition. To prevent this occurrence, a latch 238 is connected to lever 234 so that the counterclockwise rotation of lever 234 will cause latch 238 to engage abutment 240 and lock valve element 232 in the leftward position. Fuel flow to the engine will then be prevented until the pilot rotates lever 228 through lever 47 and suitable connections, to the point where a cam contacts the end of latch 238 and rotates it in a clockwise direction to disengage it from abutment 240.

*Operation*

In the operation of the fuel control of this invention, roller 112 would be in contact with lever 114 at engine startup and roller 200 would be riding freely in slot 202. The pilot would advance $N_G$ speed set lever 47 to the maximum power position with the consequent positioning of roller 112 in a position signaling for an increased fuel flow. At this time collective pitch lever 51 will not have been advanced. Recalling that an increase in the collective pitch moves roller 112 to an increased fuel flow position, it will be understood that cam 96 is contoured so that rotation of $N_G$ speed set lever 47 to the maximum power position actually establishes a position of roller 112 equivalent to maximum fuel flow required for zero collective pitch.

The movement of roller 112 in the direction of increasing fuel flow causes a counterclockwise rotation of cam 122 and shaft 124, and the counterclockwise rotation of shaft 124 causes a counterclockwise rotation of link 204 to bring the bottom of slot 202 into contact with roller 200. $N_F$ speed set lever 49 will be in the minimum position at this time and hence the bottom of slot 202 will come into contact with roller 200 before roller 112 reaches the point called for by the position of cam 96. The contact between the bottom of slot 202 and roller 200 will prevent further rotation of shaft 124 and cam 122, and hence roller 112 will move out of contact with lever 114 and the free turbine control unit will override the gas generator control unit. $N_F$ speed set lever 49 will then be rotated to establish a free turbine speed, and cam 186 will be rotated to move roller 200 in an increased fuel flow direction, contact being maintained between roller 200 and the bottom of slot 202 through the force of spring 206. In this manner, cam 122 will be rotated in an increased fuel flow direction to deliver the amount of fuel to the burners necessary to establish the selected speed of the free turbine. In essence, the position of roller 112 establishes the relationship between fuel flow and gas generator speed required to operate the engine at the selected gas generator operating conditions, and the position of roller 200 establishes the relationship between free turbine speed and fuel flow necessary to drive the free turbine at a desired speed.

Collective pitch lever 51 will then be moved in an increasing pitch direction to establish a load on rotor 12 and the free turbine to make the helicopter airborne. The increased pitch of blades 14 is fed into the gas generator control unit through lever 184 to translate cam 96 and reestablish the maximum fuel flow as indicated by a new position of roller 112; and the increased collective pitch is fed into the free turbine control unit through cam 220 to reset the fuel flow established by the position of roller 200. Throughout the remainder of the operation of the helicopter, any change in collective pitch is used to reset the fuel flow schedules established by both the gas generator control unit and the free turbine control unit.

The resetting of position of roller 200 in accordance with changes in collective pitch contributes to maintaining a constant rotor speed. This is accomplished by resetting the governor droop schedule at which the free turbine control unit is operating so that a new fuel flow versus speed schedule is established for each change of collective pitch, and the usual speed change associated with governor droop is minimized.

In the event that $N_F$ speed set lever 49 were advanced to a position at which the fuel flow called for by the position of roller 200 exceeds the operating limits of the gas generator, cam 122 would be rotated counterclockwise until lever 114 once again came in contact with roller 112. The position of roller 112 is commensurate with the safe operating limits of the gas generator, and contact between lever 114 and roller 112 will prevent further rotation of cam 122 in an increased fuel flow direction. In this event, it will be appreciated that the gas generator control unit has overriden the free turbine control unit to limit fuel flow in accordance with the safe operating limits of the gas generator.

The incorporation of a collective pitch signal in cam 96 to modify the position of roller 112 serves an important function in the event of a malfunction of the free turbine governor. If the position of roller 112 were commensurate with the maximum operating limit of the gas generator without regard to the load imposed on the rotor, any malfunction of the free turbine governor would result in establishing the maximum permissible fuel flow to the gas generator and hence result in a severe overspeed of the free turbine. However, by limiting the position of roller 112 in accordance with the collective pitch of blades 14 this potential overspeed condition of the free turbine is eliminated. The position of roller 112 and the fuel flow scheduled thereby is made a function of both the operating limits of the gas generator and the load imposed on the free turbine by the pitch of blades 14. Hence, in the event of a malfunction of the free turbine governor, the fuel flow established by the gas generator unit is compatible with the collective pitch of blades 14 and the load on the free turbine, and any overspeed of the free turbine speed is limited to a predetermined acceptable value.

As an alternative method of starting, the $N_G$ speed set lever can be advanced to the predetermined ground idle position, the $N_F$ speed set lever can then be advanced to the selected free turbine speed, and the $N_G$ speed set lever then advanced to its maximum position to cause the gas generator and power turbine to accelerate until the free turbine control unit establishes control and regulates fuel flow to maintain a selected free turbine speed.

Referring now to FIGURE 3, an installation is shown in which two engines 10 are used to drive shaft 36 and rotor 12 through a gear box 34', a clutch 250 is provided on each free turbine output shaft to prevent one engine from driving the other, and a control 52 is provided for each engine. The operation of each control is described above for a single engine installation. The incorporation of the fuel control of this invention in a twin engine installation as shown in FIGURE 3 greatly improves the load sharing of the system because it can be virtually assured that one half of the load will be absorbed by each engine merely by equalizing the speeds of the gas generators. Since the two free turbines must rotate at the same speed by virtue of their mechanical connection to the common gear box, proper load sharing will be assured between the engines because the power absorbed by each free turbine is a function of free turbine speed, and the power produced by each gas generator is a function of gas generator speed.

In addition, by contouring each cam 96 so that the position of roller 112 in each control is commensurate with the maximum power needed to maintain the selected rotor speed it is possible to have either engine assume the full load of the rotor at any collective pitch in the event that the free turbine governor of one of the engines fails. In the event of such a failure in one of the free turbine governors, that control will react to deliver an increased fuel flow. The free turbine governor of the other control will sense an increased rotor speed and will react to reduce the output of its engine, even to zero if necessary, to reestablish the selected rotor speed. The control with the malfunctioning free turbine governor will operate in the manner described above to establish the fuel flow to its engine called for by the position of the $N_G$ speed set cam as modified by collective pitch, and the most or all of the load will be absorbed by this engine.

It is to be understood that the invention is not limited to the specific embodiment herein illustrated and described but may be used in other ways without departure from its spirit as defined by the following claims.

I claim:

1. A control for an engine having a first turbine, a compressor connected to and driven by said first turbine, a combustion chamber between said compressor and said first turbine, a second turbine driven by the discharge from said first turbine, and a variable pitch blade driven by said second turbine, the control including:
   a first unit having
      means including speed selecting means for establishing a fuel flow schedule to said combustion chamber to regulate the speed of said compressor, and means responsive to changes in the speed of said compressor to adjust the fuel flow to maintain a constant compressor speed,
   a second unit having
      means including speed selecting means for establishing a fuel flow schedule to said combustion chamber to regulate the speed of said second turbine, and means responsive to changes in the speed of said second turbine to adjust the fuel flow to maintain a constant second turbine speed,
   means for rendering operative the unit of said first and second units having the lower fuel flow and rendering inoperative the other of said units,
   and means responsive to changes in the pitch of said blade for modifying both of said fuel flow schedules.

2. A control as in claim 1 including means responsive to an overspeed condition of said second turbine for terminating fuel flow to said combustion chamber, and means actuated by said overspeed responsive means to prevent the resumption of fuel flow to said combustion chamber after termination thereof.

3. A control for an engine having a first turbine, a compressor connected to and driven by said first turbine, a combustion chamber between said compressor and said first turbine, a second turbine driven by the discharge from said first turbine, and a variable pitch blade driven by said second turbine, the control including:
   a first unit having
      means for establishing a fuel flow schedule to said combustion chamber in accordance with a preselected setting to regulate the speed of said compressor, and means responsive to changes in the speed of said compressor to adjust the fuel flow to maintain a constant compressor speed,
   a second unit having
      means for establishing a fuel flow schedule to said combustion chamber to regulate the speed of said second turbine, and means responsive to changes in the speed of said second turbine to adjust the fuel flow to maintain a constant second turbine speed,
   means for rendering operative the unit of said first and second units having the lower fuel flow and rendering inoperative the other of said units,
   and means responsive to changes in the pitch of said blade for modifying both of said fuel flow schedules.

4. A control for an engine having a gas generator, a free turbine driven by said gas generator, a variable pitch blade driven by said free turbine, the control including:
   first speed selecting means for selecting a desired speed of the gas generator,
   means responsive to the speed of the gas generator and said first speed selecting means to produce a signal commensurate with the difference between the values thereof,
   second speed selecting means for selecting a desired speed of the free turbine,
   means responsive to the speed of the free turbine and said second speed selecting means to produce a signal commensurate with the difference between the values thereof,
   and means responsive to changes in pitch of said blade for modifying both of said signals.

5. A control for an engine having a gas generator, a free turbine driven by said gas generator, a variable pitch blade driven by said free turbine, the control including:
   first speed selecting means for selecting a desired speed of the gas generator,
   means responsive to the speed of the gas generator and said first speed selecting means to produce a signal commensurate with the difference between the values thereof to schedule fuel flow to said engine,
   second speed selecting means for selecting a desired speed of the free turbine,
   means responsive to the speed of the free turbine and said second speed selecting means to produce a signal commensurate with the difference between the values thereof to schedule fuel flow to said engine,
   means responsive to changes in pitch of said blade for modifying both of said signals,
   and means for selecting the lower fuel flow scheduled by said signals.

6. A control for an engine having a gas generator, a free turbine driven by said gas generator, a variable pitch blade driven by said free turbine, the control including:
   a valve for metering fuel to said engine,
   a lever connected to said valve for controlling the position thereof,
   first speed selecting means for selecting a desired speed of the gas generator,
   first signal generating means responsive to the speed of the gas generator and said first speed selecting means to produce a signal commensurate with the difference between the values thereof,
   said first signal generating means including a first cam and interconnecting means interconnecting said first cam and said lever,
   second speed selecting means for selecting a desired speed of the free turbine,
   second signal generating means responsive to the speed of the free turbine and said second speed selecting means to produce a signal commensurate with the difference between the values thereof,
   said second generating means including a second cam and interconnecting means interconnecting said second cam and said lever,
   and means responsive to changes in pitch of said blade for modifying both of said signals for disconnecting said first or said second cam from said lever.

7. In a multi-engine aircraft installation, each engine having a gas generator and a free turbine driven by the gas generator, each free turbine being connected to and driving a common rotor having a variable pitch blade thereon, a separate fuel control associated with each engine, each control delivering fuel to the gas generator of each engine and each control including:
   first speed selecting means for selecting a desired speed of the gas generator,
   means responsive to the speed of the gas generator and said first speed selecting means to produce a signal commensurate with the difference between the values thereof, second speed selecting means for selecting a desired speed of the free turbine, means including a governor responsive to the speed of the free turbine and said second speed selecting means to produce a signal commensurate with the difference between the values thereof for scheduling fuel flow and impose on the free turbine a proportional share of the rotor load, means responsive to changes in pitch of said blade for modifying both of said signals.

and said last mentioned means being responsive to a failure of said governor for increasing the part of the rotor load absorbed by the associated engine and reducing the part of the rotor load absorbed by the other engine.

References Cited by the Examiner
UNITED STATES PATENTS

| | | | |
|---|---|---|---|
| 2,696,268 | 12/54 | Marchant | 170—135.71 X |
| 2,735,499 | 2/56 | Ehlers | 170—135.71 |
| 2,947,364 | 8/60 | Haworth | 170—135.71 |
| 3,017,922 | 1/62 | Peterson | 60—39.16 |
| 3,034,583 | 5/62 | Best | 170—135.74 |
| 3,056,455 | 10/62 | Wente | 170—135.74 |
| 3,073,116 | 1/63 | Owens | 60—39.16 |
| 3,115,750 | 12/63 | Cowles et al. | 60—39.16 |

JULIUS E. WEST, *Primary Examiner.*

ABRAM BLUM, *Examiner.*